United States Patent

Dorovsky et al.

(10) Patent No.: US 8,630,146 B2
(45) Date of Patent: Jan. 14, 2014

(54) METHOD AND APPARATUS FOR ESTIMATING FORMATION PERMEABILITY AND ELECTROACOUSTIC CONSTANT OF AN ELECTROLYTE-SATURATED MULTI-LAYERED ROCK TAKING INTO ACCOUNT OSMOSIS

(75) Inventors: Vitaly N. Dorovsky, Novosibirsk (RU); Vladimir Dubinsky, Houston, TX (US); Zarema Dubinsky, legal representative, Houston, TX (US); Yuriy A. Nefedkin, Novosibirsk (RU); Alexander I. Fedorov, Novosibirsk (RU); Maxim Y. Podberezhnyy, Novosibirsk (RU); Yury V. Perepechko, Novosibirsk (RU)

(73) Assignee: Baker Hughes Incorporated, Houston, TX (US)

( * ) Notice: Subject to any disclaimer, the term of this patent is extended or adjusted under 35 U.S.C. 154(b) by 760 days.

(21) Appl. No.: 12/748,213

(22) Filed: Mar. 26, 2010

(65) Prior Publication Data

US 2010/0254218 A1 Oct. 7, 2010

Related U.S. Application Data

(60) Provisional application No. 61/166,152, filed on Apr. 2, 2009.

(51) Int. Cl.
*G01V 1/50* (2006.01)
(52) U.S. Cl.
USPC .............................................. 367/38; 367/140
(58) Field of Classification Search
USPC ........... 73/152; 181/102, 112; 367/31, 39, 57, 367/912; 702/9, 11
See application file for complete search history.

(56) References Cited

U.S. PATENT DOCUMENTS

| | | | |
|---|---|---|---|
| 4,831,600 A | | 5/1989 | Hornby et al. |
| 4,964,101 A | * | 10/1990 | Liu et al. .......................... 367/31 |
| 5,452,761 A | | 9/1995 | Beard et al. |
| 5,784,333 A | | 7/1998 | Tang et al. |
| 5,841,280 A | | 11/1998 | Yu et al. |
| 6,061,300 A | * | 5/2000 | Yamamoto ...................... 367/57 |
| 6,225,826 B1 | | 5/2001 | Krishnamurthy et al. |
| 6,272,434 B1 | * | 8/2001 | Wisler et al. ...................... 702/9 |

(Continued)

FOREIGN PATENT DOCUMENTS

| | | | | |
|---|---|---|---|---|
| WO | | 2007001746 A1 | 1/2007 | |
| WO | | WO 2008097121 A1 | * 8/2008 | ............... G01V 1/00 |

OTHER PUBLICATIONS

Brie et al., "Quantitative Formation Permeability Evaluation from Stoneley Waves," SPE 49131, pp. 1-12, 1998.*

(Continued)

*Primary Examiner* — Isam Alsomiri
*Assistant Examiner* — Daniel L Murphy
(74) *Attorney, Agent, or Firm* — Mossman Kumar & Tyler PC

(57) ABSTRACT

An acoustic source on a logging tool is used to generate acoustic waves in a borehole. Acoustic detectors on the logging tool measure the generated acoustic waves. Electrodes on the logging tool are used to measure the potential resulting from the generated acoustic wave. The output of the hydrophones and the electrodes corresponding to Stoneley wave components of the acoustic wave are processed to provide an estimate of formation permeability, acoustoelectric constant, and a velocity of a propagating second compressional wave in the formation.

19 Claims, 16 Drawing Sheets

(56) References Cited

U.S. PATENT DOCUMENTS 6,452,395 B1 9/2002 Clarke et al.
6,842,697 B1 1/2005 Millar et al.
7,257,490 B2 * 8/2007 Georgi et al. .................. 702/11
2008/0306692 A1 12/2008 Singer et al.

OTHER PUBLICATIONS

"Classical Electrodynamics," 2nd ed., J.D. Jackson, Wiley, 1975, pp. 270 and 286.*
Mikhailov, Oleg V., "Using borehole electroseismic measurements to detect and characterize fractured (permeable) zones," Geophysics, vol. 65, No. 4, pp. 1098-1112 (Jul.-Aug. 2000).
Biot, M.A., "Theory of Propagation of Elastic Waves in Fluid-Saturated Porous Solid," Jnl Acoustical Soc. Amer., vol. 28, No. 2., Mar. 1956, pp. 168-191.
Winkler, .K.W., et al., "Permeability and Borehole Stoneley Waves: Comparison Between Experiment and Theory," Geophysics, vol. 54, No. 1, Jan. 1989, pp. 66-75.
Dorovsky, V.N., et al., "A Mathematical Model for the Movement of a Conducting Liquid through a Conducting Porous Medium," Mathl. Comput. Modeling, vol. 20, No. 7, May 1994, pp. 91-97.

* cited by examiner

METHOD AND APPARATUS FOR ESTIMATING FORMATION PERMEABILITY AND ELECTROACOUSTIC CONSTANT OF AN ELECTROLYTE-SATURATED MULTI-LAYERED ROCK TAKING INTO ACCOUNT OSMOSIS

CROSS-REFERENCES TO RELATED APPLICATIONS

This application claims priority from U.S. Provisional Patent Application Ser. No. 61/166,152 filed on Apr. 2, 2009.

FIELD OF THE DISCLOSURE

The present disclosure is related to the field of acoustic wellbore logging. More specifically, the disclosure is related to methods of and devices for determining the permeability to fluid flow and electrical properties of earth formations containing electrically conducting fluids.

BACKGROUND OF THE ART

Acoustic borehole logging instruments are used to measure velocities of earth formations in one or more modes of acoustic energy propagation. Acoustic borehole logging instruments are typically used in liquid-filled boreholes drilled through the earth formations. Velocity is generally determined using these instruments by measuring the time taken by an acoustic energy pulse to traverse a particular distance along the wall of the wellbore. The wall forms the interface between the liquid in the wellbore and the earth formations.

One form of acoustic energy pulses of particular interest to the disclosure is referred to as "Stoneley" waves. Stoneley waves are essentially guided interface waves traveling in the borehole at the fluid-formation interface. It had been determined in earlier research that a relationship is likely to exist between the transmission properties of Stoneley waves as they propagate along the borehole, and the hydraulic characteristics of the formations along the wellbore wall. U.S. Pat. No. 5,784,333 to Tang et al., having the same assignee as the present disclosure teaches a method for determining the permeability of earth formations penetrated by a borehole from acoustic signals measured by an acoustic borehole logging instrument. The method includes separating components from the measured acoustic signals which represent Stoneley waves propagating through the earth formations. Signals representing Stoneley waves propagating through the same earth formations are synthesized. The separated acoustic signal components and the synthesized Stoneley wave signals are compared. The permeability is determined from differences between the synthesized Stoneley wave signals and the separated acoustic signal components. Hornby et al. (1989) discloses a method of evaluating fracture arrivals in an earth formation by analyzing the Stoneley wave signals.

Other methods of estimating formation permeability have made use of the electroseismic effect wherein an electric field is produced in an earth formation by generating a seismic wave in a borehole, and the resulting electric field is measured. Due to the fact that the seismic wave is omnidirectional, the resolution of the method is poor. The present disclosure addresses this drawback.

SUMMARY OF THE DISCLOSURE

One embodiment of the disclosure is a method of determining a property of a porous earth formation. The method includes generating an acoustic wave in a borehole; producing a pressure signal responsive to propagation of the generated acoustic wave in the borehole; producing an electrical signal responsive to the propagation of the generated acoustic wave in the borehole; and using the pressure signal and the electrical signal to estimate a property of the formation selected from: (i) a permeability of the formation, (ii) an electroacoustic constant of the formation, and (iii) a compressional velocity of the formation.

Another embodiment of the disclosure is an apparatus for determining a property of a porous earth formation. The apparatus includes an acoustic source on a logging tool configured to generate an acoustic wave in a borehole; at least one detector on the logging tool configured to produce a pressure signal responsive to propagation of the generated acoustic wave in the borehole; at least one additional detector on the logging tool configured to produce an electrical signal responsive to the propagation of the generated acoustic wave in the borehole; and a processor configured to use the pressure signal and the electrical signal to estimate a property of the formation selected from: (i) a permeability of the formation, (ii) an electroacoustic constant of the formation, and (iii) a compressional velocity of the formation.

Another embodiment of the disclosure is a computer-readable medium accessible to at least one processor, the computer-readable medium including instructions which enable the at least one processor to estimate a property of the formation selected from: (i) a permeability of the formation, (ii) an electroacoustic constant of the formation, and (iii) a second compressional velocity of the formation using a pressure signal responsive to propagation of a generated acoustic wave in a borehole and an electrical signal responsive to the propagation of the generated acoustic wave in the borehole.

BRIEF DESCRIPTION OF THE DRAWINGS

For detailed understanding of the present disclosure, reference should be made to the following detailed description of the preferred embodiment, taken in conjunction with the accompanying drawing and in which:

FIG. 8B shows the estimated attenuation length for the data of FIG. 8a;

DETAILED DESCRIPTION OF THE DISCLOSURE

The present disclosure is discussed with reference to specific logging instruments that may form part of a string of several logging instruments for conducting wireline logging operations. It is to be understood that the choice of the specific instruments discussed herein is not to be construed as a limitation and that the method of the present disclosure may also be used with other logging instruments as well.

Figure 1A:
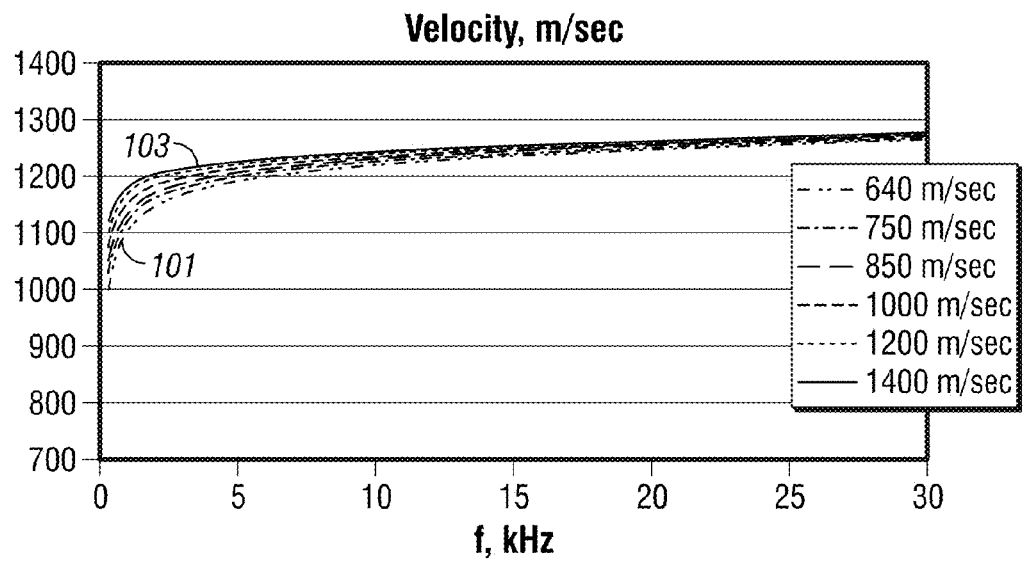
FIG. 1A illustrates the frequency dependence of the velocity of the Stoneley wave for different values of second compressional velocity of the porous medium.

The method of the present disclosure is based upon theoretical analysis of the behavior of Stoneley waves in a borehole. This is based on the relationship of the permeability and electroacoustic constant of an electrolyte-saturated porous rock formation beyond the borehole using the relationship between the electroacoustic ratio (i.e. the ratio of the electric field amplitude to the causative acoustic amplitude) and the permeability k of the medium for the Stoneley waves. This is based upon the dependence of the electroacoustic conversion factor on the permeability and electroacoustic constant α, the latter being expressed as follows:

$$\frac{E_z}{V_z} = \alpha k \Phi(\alpha, k), \quad (1)$$

where $E_z$ and $V_z$ are the electric field and velocity of the medium, $\Phi(\alpha, k)$ is a weakly dependent function of both arguments. Then, the product αk is an almost constant value and proportional to the zeta-potential, which characterizes the double-layer in the porous medium. The theoretical foundations of this method are pre-computed electroacoustic properties of the Stoneley waves inside the borehole. This measurement method is based on the fundamental of the dissipative properties of the phase velocity and dissipative properties of the electroacoustic ratio. FIG. 1a shows the theoretical dependence of the phase velocity of the Stoneley waves for different values of the compressional wave velocity of the formation in the porous medium. Seven curves are shown, and for clarity, only the curves corresponding to velocities of 640 m/s and 1400 m/s are labeled as 101 and 103. It should be noted that in this document, unless otherwise specified, the compressional velocity of the Biot wave of the second kind for a porous medium is intended.

Figure 1B:
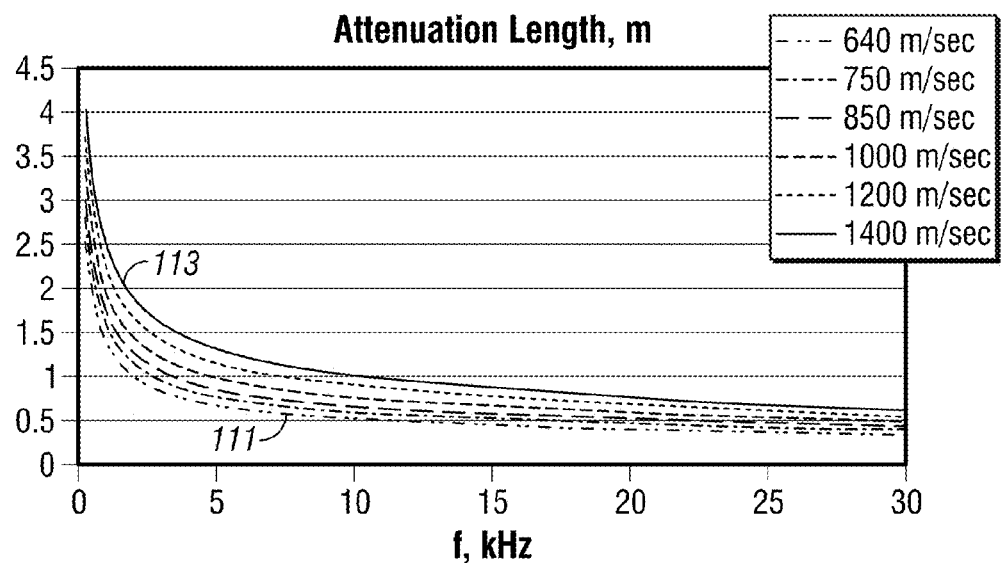
FIG. 1B illustrates the frequency dependence of the attenuation length of the Stoneley wave for different values of second compressional velocity of the porous medium.

Similarly, FIG. 1b shows the attenuation length of the Stoneley wave as a function of frequency for different velocities of the second compressional wave in the porous medium. Seven curves are shown, and or clarity, only the curves corresponding to velocities of 640 m/s and 1400 m/s are labeled as 111 and 113. The attenuation length is the distance the Stoneley wave has propagated along the borehole for its amplitude to decrease by 3 dB.

Figure 2:
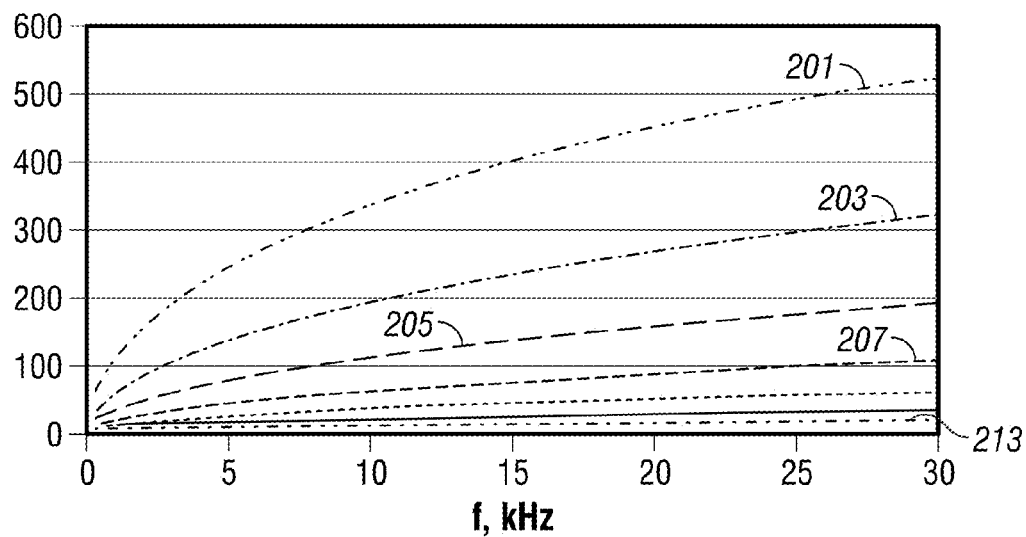
FIG. 2 shows the frequency dependence of the Biot wave of the second kind for different values of permeability.

In the present disclosure, the permeability dependence of the Stoneley waves' properties is defined by their dependence on the second compressional velocity in the saturated porous medium. The second compressional velocity itself strongly depends on permeability of the porous medium. This characteristic dependence is presented in FIG. 2 below for an exemplary medium. Seven curves are shown and, for clarity, the curves corresponding to 1000 mD (201), 300 mD (203), 100 mD (205), 30 mD (207) and 1 mD (213) are labeled. The second compressional wave is also commonly referred to in literature as a Biot wave of the second kind.

In practice, the frequency of the phase velocity $v^*_{ST}(\omega)$ of the Stoneley wave and the attenuation length $L^*_{ST}(\omega)$ are measured using methods discussed below. The corresponding physical theory gives:

$$v_{ST}(\overline{\chi}, c_{p2}) = V^*_{ST}(\omega) \quad (2),$$

$$L_{ST}(\overline{\chi}, c_{P2}) = L^*_{ST}(\omega) \quad (3),$$

and $$c_{p2}(\omega) = c_{p2}(\overline{\chi}) \quad (4).$$

Taking into account the electroacoustic constant, these dependences yield the theoretical friction coefficient $\overline{\chi} = \chi - \alpha^2/\sigma$. The resulting frequency dependence of the phase velocity of the Stoneley waves and their attenuation length at a fixed electroacoustic constant are given in FIGS. 3a, 3b.

Figure 3A:
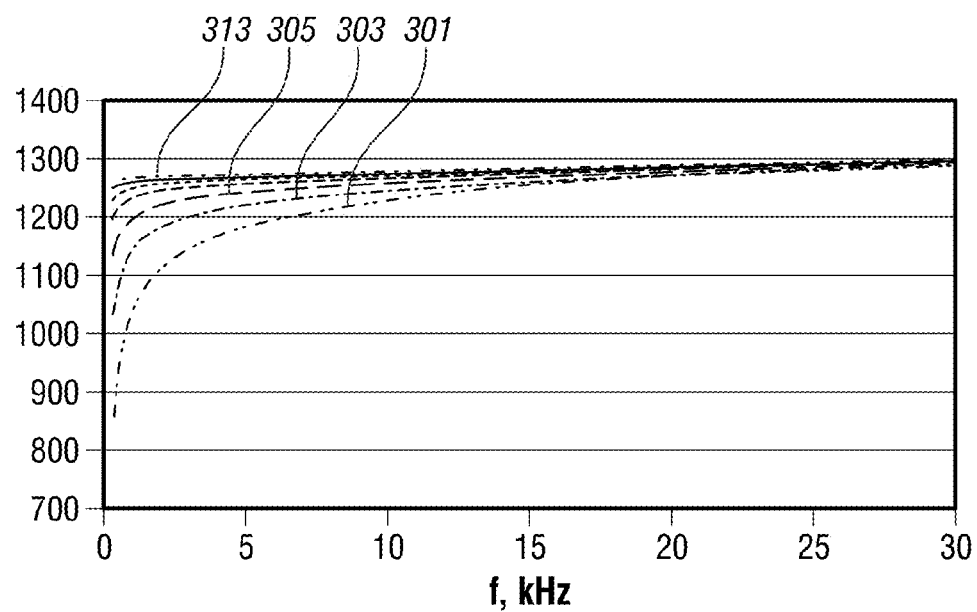
FIG. 3A illustrates the frequency dependence of the velocity of the Stoneley wave for different values of permeability of the porous medium for a fixed value of the electroacoustic constant.
Figure 3B:
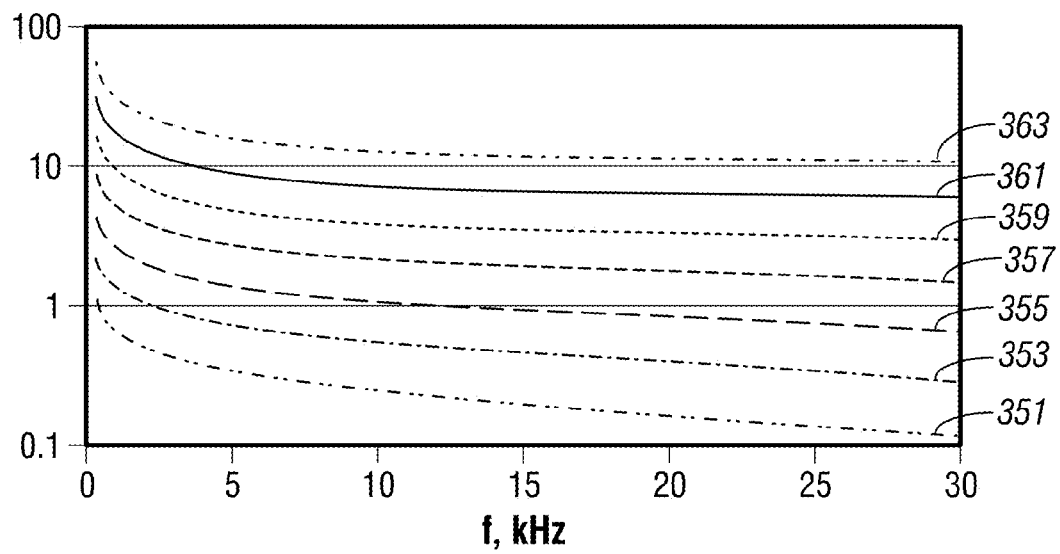
FIG. 3B illustrates the frequency dependence of the attenuation length of the Stoneley wave for different values of permeability of the porous medium for a fixed value of the electroacoustic constant.

FIG. 3a shows the frequency dependence of the phase velocity of the Stoneley wave for different values of permeability and a fixed value of the electroacoustic constant. Seven curves are shown and curves for 1000 mD (301), 300 mD (303), 100 mD (305), and 1 mD (313) are labeled. FIG. 3b shows the frequency dependence of the attenuation length of the Stoneley wave for different values of permeability and a fixed value of the electroacoustic constant. Seven curves are shown for 1000 mD (351), 300 mD (353), 100 mD (355), 30 mD (357), 10 mD (359), 3 mD (361) and 1 mD (363).

The electroacoustic ratio (i.e. the ratio of the electric field amplitude to the causative acoustic amplitude) is a function of the friction coefficient $\bar{\chi}$, second compressional velocity $c_{p2}$, and electroacoustic constant $\alpha$:

$$\frac{E}{P} = \varphi(\alpha, \bar{\chi}, c_{p2}). \tag{5}$$

Knowing the measured value of the electroacoustic ratio and the value of $\bar{\chi}$, it is possible to compute the electroacoustic constant $\alpha$. The basis for this procedure is the dependence given below; it had been obtained theoretically. These results follow from the Continual Filtration Theory. The following three paragraphs give a comparison of the Continual Filtration Theory and the Biot theory.

The motion equations for the porous medium in these two theories can be represented as follows:

$$\rho_{11}\ddot{u}+\rho_{12}\ddot{v}-(P-N)\nabla \text{ div } u-Q\nabla \text{ div } v-N\Delta u+b(\dot{u}-\dot{v})=0 \tag{6},$$

$$\rho_{12}\ddot{u}+\rho_{22}\ddot{v}-Q\nabla \text{ div } u-R\nabla \text{ div } v-b(\dot{u}-\dot{v})=0 \tag{7},$$

The fluid equations can be reduced to one equation determining the fluid velocity inside the wellbore:

$$\rho_f \ddot{v}^* - M\nabla \text{ div } v^* = 0 \tag{8}$$

The boundary conditions, expressed in terms of velocities in the continual filtration theory and in terms of displacements in the Biot-Johnson theory, take the following forms:

the form obtained from the condition of total mass conservation:

$$u_r(1-\phi)+v_r\phi=v^*_r \tag{9},$$

the form obtained from the condition of total momentum conservation:

$$N(\partial_z u_z - \partial_z u_r) = 0 \tag{10},$$

the form obtained from the condition of total momentum conservation:

$$(P+Q-2N)\text{div } u+(Q+R)\text{div } v+2N\partial_r u_r = M \text{ div } v^* \tag{11},$$

the form obtained from the equilibrium condition of the fluid momentum:

$$Q \text{ div } u+R \text{ div } v+b_b(\dot{\phi}_u-\dot{\phi}_v)=\phi M \text{ div } v \tag{12}.$$

The parameters P, Q, R, N are expressed via elastic moduli (Table 1):

in the Biot-Johnson theory, via $K_s$, $K_b$, N, $K_f$;
in the Continual filtration theory, via K, $\gamma$, $\mu$.

TABLE 1

Properties of the theories

| | Biot-Johnson theory | Continual theory of filtration |
|---|---|---|
| Variable | | |
| u | solid displacement vector | solid velocity vector |
| v | fluid displacement vector | fluid velocity vector |
| v° | liquid displacement vector | liquid velocity vector |

TABLE 1-continued

Properties of the theories

| | Biot-Johnson theory | Continual theory of filtration |
|---|---|---|
| Module | | |
| P | $\frac{1}{\Delta}((1-\phi)((1-\phi)K_s - K_b) + \phi K_s K_b/K_f) + \frac{4}{3}N$ | $\frac{\rho_s^2}{\rho^2}\gamma + \frac{\rho_l^2}{\rho^2}K + \frac{4}{3}\mu$ |
| Q | $\frac{1}{\Delta}\phi((1-\phi)K_s - K_b)$ | $\frac{\rho_s \rho_l}{\rho^2}\gamma - \frac{\rho_l^2}{\rho^2}K$ |
| R | $\frac{1}{\Delta}\phi^2 K_s$ | $\frac{\rho_l^2}{\rho^2}\gamma + \frac{\rho_l^2}{\rho^2}K$ |
| N | N | $\mu$ |
| M | M | M |
| Density | | |
| $\rho_{11}$ | $\rho_s - \rho_{12}$ | $\rho_s$ |
| $\rho_{22}$ | $\rho_l - \rho_{12}$ | $\rho_l$ |
| $\rho_{12}$ | $-(\alpha_t - 1)\rho_l$ | 0 |
| Dissipative coefficient | | |
| b | $\phi^2 \frac{\eta}{k}$ | $\frac{\rho_l}{\rho} \cdot \frac{\eta}{k_0}$ |

The following notations were used in the Table 1:

$$\Delta = (1-\phi)-K_b/K_s+\phi K_s/K_f \tag{13}.$$

The diffusion coefficient at the boundary $b_b$ can be expressed as $\kappa b$, where $\kappa$ is a set parameter. However, in the general case, $b_b$ may be defined differently.

It should be noted that in [K. W. Winkler, H. L. Liu, D. L. Johnson, 1989], only the elastic moduli $K_s$, $K_f$ were set initially, and the elastic moduli $K_b$ and N were found from the first compressional velocity of sound (first P-wave) $c_{p1}$ and from the shear velocity of sound (S-wave) $c_t$.

In the continual theory of filtration all the elastic moduli K, $\gamma$, $\mu$ of this theory were found from the first compressional velocity of sound (first P-wave) $c_{p1}$, the second compressional velocity of sound (second P-wave) $c_{p2}$, and the shear velocity of sound (S-wave) $c_f$.

Pressure and the stress tensor in these theories in terms of P, Q, R are expressed as follows in Table 2:

TABLE 2

Pressure and the stress tensor in the theories

| Theory | Biot-Johnson | Continual theory of filtration |
|---|---|---|
| Pressure | | |
| p | $-\frac{1}{\phi}Q \text{ div } u - \frac{1}{\phi}R \text{ div } v$ | $-\frac{\rho}{\rho_l}Q \text{ div } u - \frac{\rho}{\rho_l}R \text{ div } v$ |
| Full stress tensor | | |
| $\sigma_{ik}$ | $(P + Q - 2N)\delta_{ik} \text{ div } u - (Q + R)\delta_{ik} \text{ div } v + + N(\partial_i u_k + \partial_k u_i)$ | $(P + Q - 2N)\delta_{ik} \text{ div } u - (Q + R)\delta_{ik} \text{ div } v + + N(\partial_i u_k + \partial_k u_i)$ |

Figure 4:
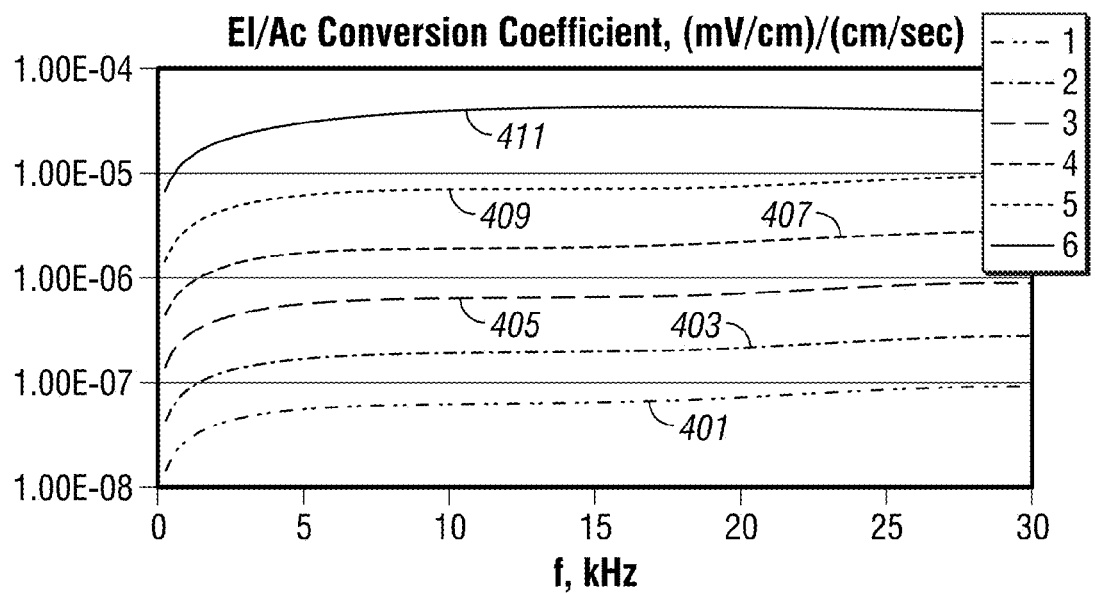
FIG. 4 shows the frequency dependence of the electroacoustic conversion coefficient for a permeability of 100 mD and different values of the electroacoustic constant.

FIG. 4 shows the frequency dependence of the electroacoustic conversion coefficient for a formation with a permeability of 100 mD and different values of the electroacoustic ratio $\alpha$: (401)—$10^6$, (403)—$3\cdot 10^6$, (405)—$10^7$, (407)—$3\cdot 10^7$, (409)—$10^8$, (411)—$3\cdot 10^8$ cm/(Gs·s$^2$). At the last step, the true friction coefficient is estimated using the following equations (electroacoustic effects are not considered here):

$$\chi = \bar{\chi} + \beta^2/\sigma, \quad k = \eta/(\rho\rho_f\bar{\chi}) \quad (14)$$

where $\rho$ is the formation density and $\rho_f$ is the partial density of the fluid in the formation. The partial fluid density can be calculated using the relation $\rho_f = \rho_f \phi$ where $\rho_f$ is the fluid density and $\phi$ is the porosity.

To summarize, by making measurements of the right hand side terms of the following equations:

$$v_{st}(\bar{\chi}, c_{p2}, \omega) = v_{st}^*(\omega),$$

$$L_{st}(\bar{\chi}, c_{p2}, \omega) = L_{st}^*(\omega) \quad (15),$$

$$\varphi(\alpha, \bar{\chi}, c_{p2}, \omega) = \frac{E}{P}(\omega),$$

i.e., frequency dependence of the velocities of the Stoneley waves, their attenuation length, and their electroacoustic conversion coefficient, we solve this set of equations arriving at the desired permeability, electroacoustic constant, and second compressional velocity.

Figure 5:
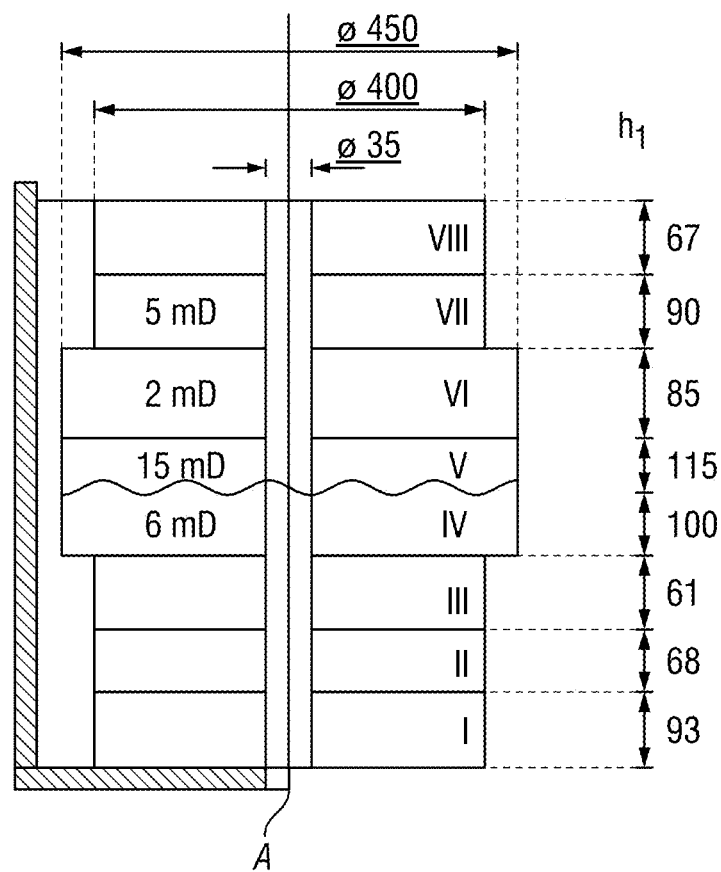
FIG. 5 shows a model used to study the method of the present disclosure.

FIG. 5 shows a borehole model used to test the method described. It comprises eight layers (labeled I, II, III, IV, V, VI, VII and VIII). Layers I-III and VII-VIII had an outer diameter of 400 mm while the other three layers had an outer diameter of 420 mm. A borehole with a diameter of 35 mm is filed with water.

Figure 6:
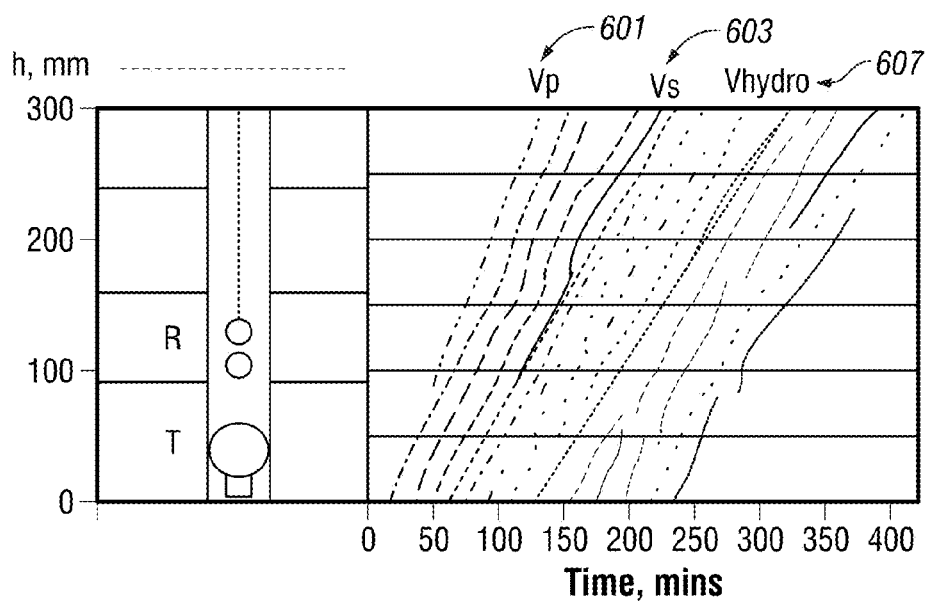
FIG. 6 shows acoustic signals recorded with a wide-band source and a hydrophone at different positions in the model.
Figure 7:
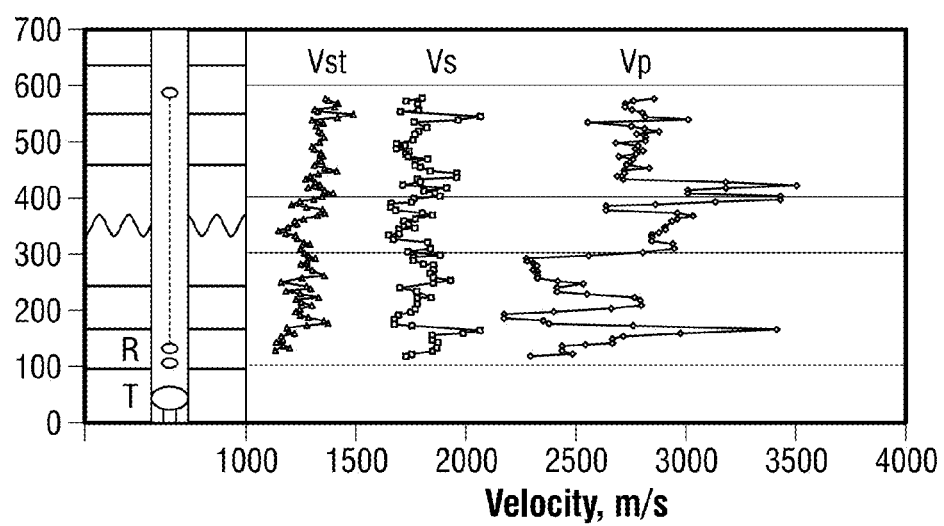
FIG. 7 shows estimated profiles of $v_{st}$, $c_{p1}$ and $c_t$ for the data of FIG. 6.

FIG. 6 shows acoustic signals recorded using a hydrophone at different positions in the model responsive to excitation of a wide-band source in a fixed position. The arrivals corresponding to the P-arrival in the formation 601, the shear arrival in the formation 603 and the direct arrival through the borehole 607 are indicated. By frequency filtering, Stoneley waves can be identified. The resulting estimates of $v_{st}$, $c_{p1}$ and $c_t$ are shown in FIG. 7.

Figure 8A:
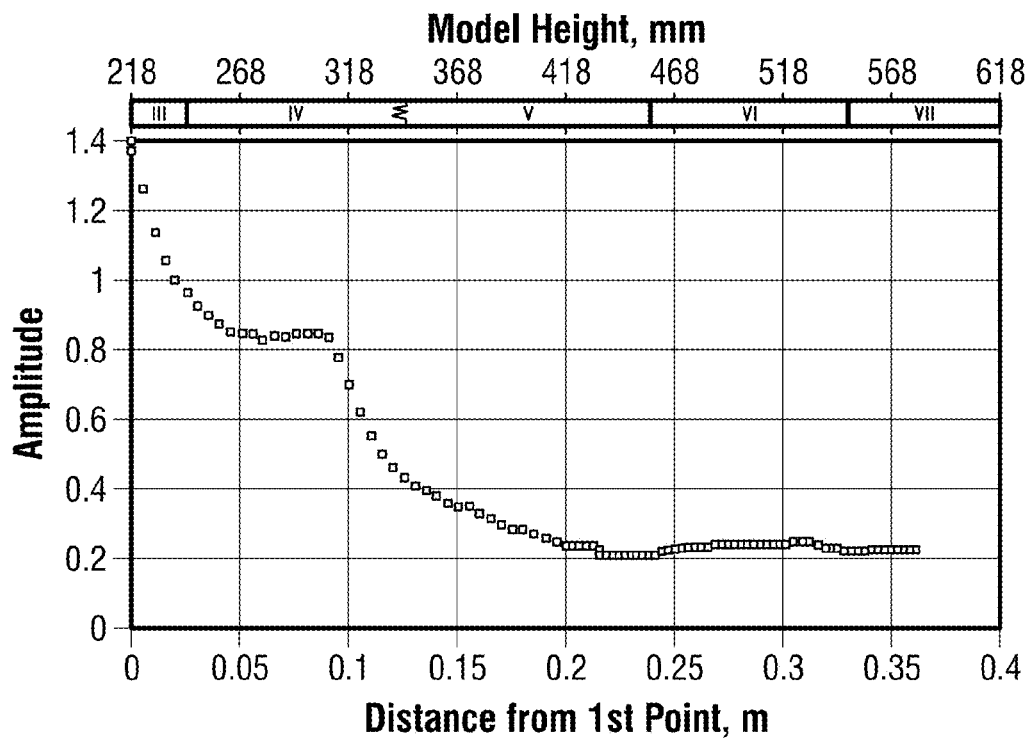
FIG. 8A shows amplitudes of the Stoneley wave arrivals recorded with a low frequency source and a low frequency bender-bar type receiver.
Figure 8B:
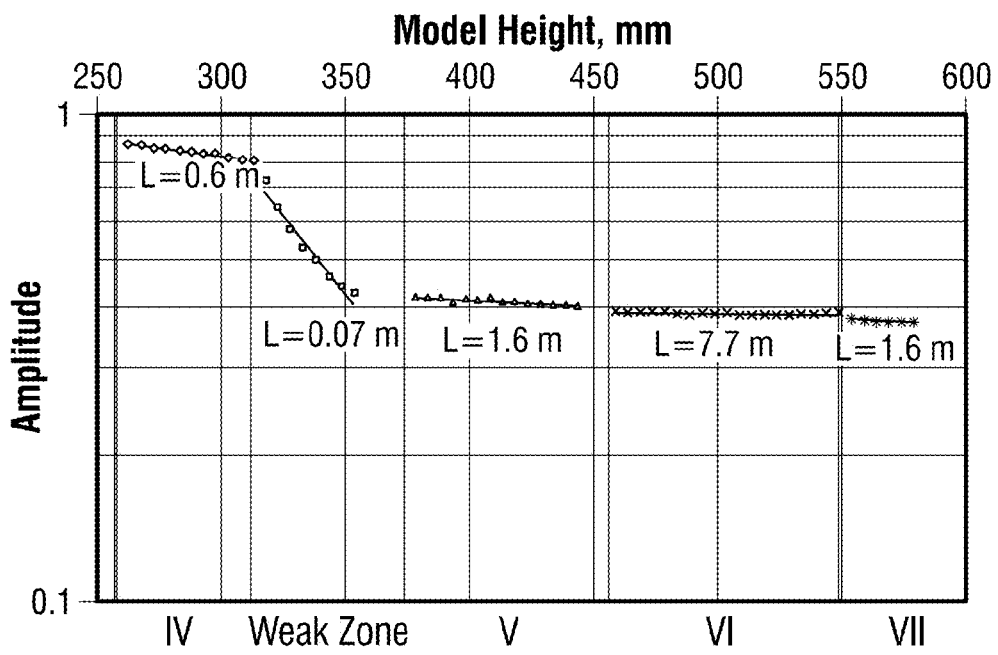

In order to provide a clearer analysis of the Stoneley wave signals, the data are recorded using a low frequency bender bar receiver and a low frequency source. FIG. 8a shows the amplitudes of the Stoneley wave arrivals as a function of distance from the source. FIG. 8b shows the data of FIG. 8a processed to give the Stoneley wave attenuation length. Table 3 shows a comparison of the measured attenuation lengths and the known permeability of the layers of the model.

TABLE 3

Comparison of Stoneley wave attenuation length and permeability

| Layer # | L, m | Permeability, mD |
|---|---|---|
| IV | 1.3 | 6 |
| Boundary IV-V | 0.06 | — |
| V | 0.3 | 15 |
| VI | 7.7 | 2 |
| VII | 1.6 | 5 |

As expected from FIG. 3b, layers with higher permeability have a smaller attenuation length.

To study the acoustoelectric effects, the acoustoelectric field was measured separately from the acoustic field. The reason for this was simply to avoid interference with the sensor used for measuring the electric field of noise from the electronic circuitry used for measuring the acoustic signal. For implementation of the present method in a well logging system, the presence of this interference would mean, at worst, a slowing down of logging operations so that the two signals could be recorded separately. For the model study, the electric potential was measured by a button electrode relative to a reference electrode attached to a grounded screen on the outside of the model.

Figure 9:
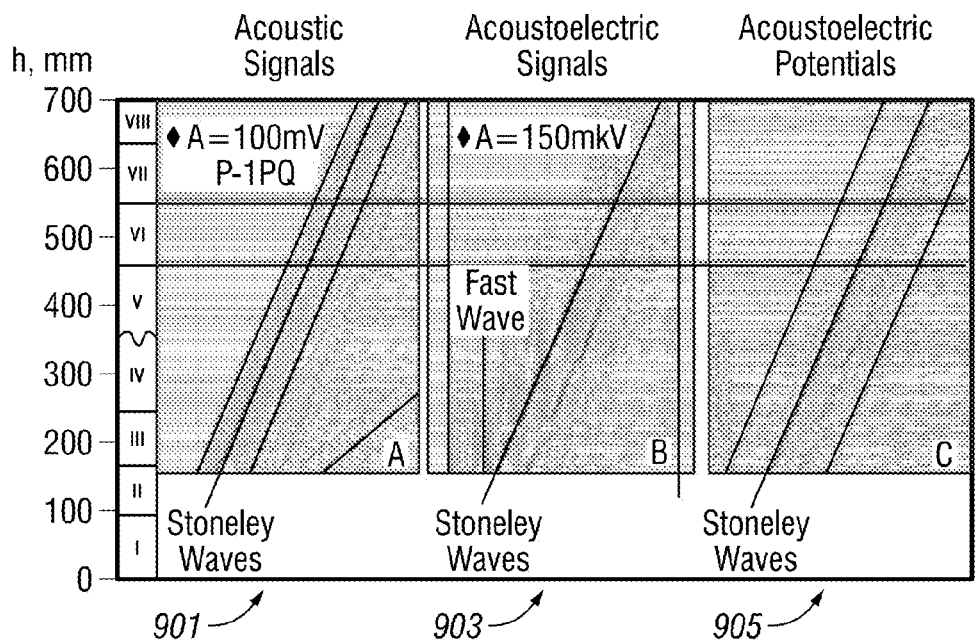
FIG. 9 shows the fields for Stoneley waves obtained using acoustoelectric measurements.

901 in FIG. 9 shows the acoustic signals recorded from excitation of the low frequency acoustic source in the borehole. 903 shows the acoustoelectric signals (the electric potential at a fixed point) while the panel 905 shows the acoustoelectric potentials is the first difference between acoustoelectric signal at successive points.

Figure 10:
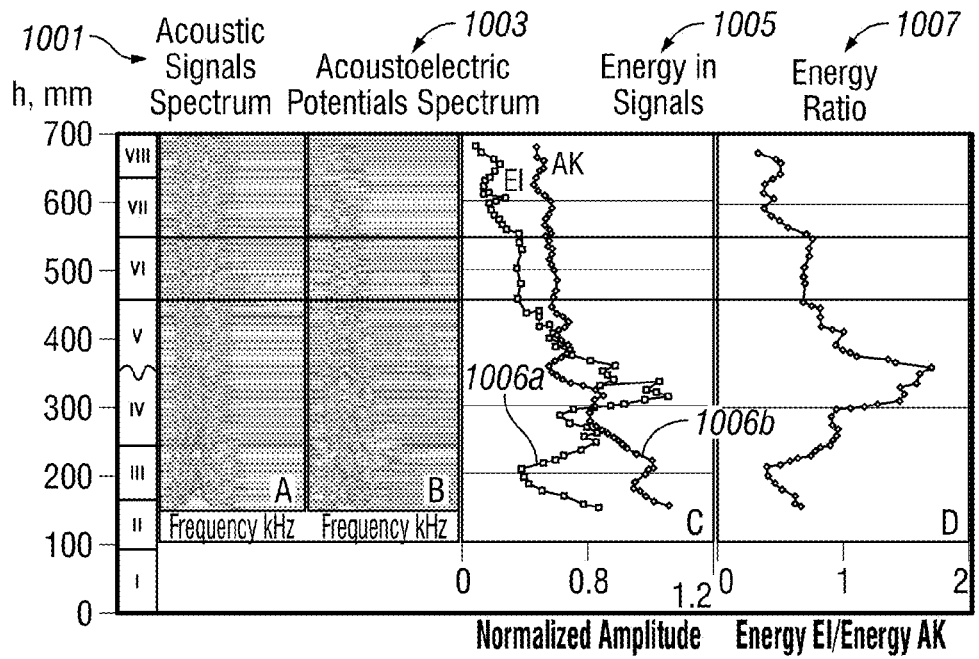
FIG. 10 shows the dynamic characteristics of the acoustic signal and the corresponding electric potential.

Turning to FIG. 10, the panel 1001 shows the spectrum of the acoustic signal corresponding to the Stoneley wave, the panel 1003 shows the spectrum of the acoustoelectric potential. 1006a in panel 1005 shows the energy of the electric signal while 1006b shows the energy of the acoustic signal. The electrokinetic energy ratio is shown in 1007. Further analysis was carried out for layer VI of the model as an example.

Spectral analysis of the acoustic and the acoustoelectric signal gave the following values for phase velocities and attenuation length of the Stoneley waves at two frequencies: 13.3 kHz and 17.6 kHz.

TABLE 4

| Frequency (kHz) | Acoustic signal (m/s) | Acoustoelectric signal (m/s) | Attenuation length (m) |
|---|---|---|---|
| 13.3 | 1345 | 1357 | 7.9 |
| 17.6 | 1357 | 1357 | 6.0 |

The solution of the inverse problem is directed towards the processing of experimental data on the phase velocity, attenuation length, and electroacoustic ratio, with the goal of obtaining permeability, the electroacoustic constant, and the second compressional velocity. For the forward problem, an algorithm of finding the velocity, attenuation length, and electroacoustic ratio for the Stoneley waves was used numerically. The solution to the inverse problem, as examples above have shown, can be obtained in two steps. First, the friction coefficient $\chi$, as well as the second sound velocity $c_{p2}$ should be determined, taking into account the electroacoustic effect and using the following set of equations:

$$V_{st}(\bar{\chi}, c_{p2}) = V_{st}^* \quad (16),$$

$$L_{st}(\bar{\chi}, c_{p2}) = L_{st}^* \quad (16)$$

where $V_{st}(\bar{\chi}, c_{p2})$ and $L_{st}(\bar{\chi}, c_{p2})$ are numerical (implicit) functions to calculate the Stoneley wave velocity and its attenuation length, $v_{st}^*$, $L_{st}^*$ are values measured experimentally for a particular part of the layered model. The solution to this set is sought via computing the values of these functions on a fixed grid (with the necessary accuracy) and subsequent minimization of the residual function $\Xi$ on this grid:

$$\Xi = \sqrt{\sigma_V^2 + \sigma_L^2}, \quad (17)$$

$$\sigma_V = \frac{V_{st}(\bar{\chi}_i, (c_{p2})_j)}{V_{st}^*} - 1,$$

$$\sigma_L = \frac{L_{st}(\bar{\chi}_i, (c_{p2})_j)}{L_{st}^*} - 1,$$

where $\bar{\chi}_i$ is the friction coefficient at the i-th node of the grid, $(c_{p2})_j$ is the second compressional velocity at the j-th node of the grid. Accuracy of root determination is controlled by the output data on the general residual and by residuals $\sigma_v$, $\sigma_L$ which contain information on accuracy of the forward problem solution for each of the functions.

At the next step, the electroacoustic constant is found, based on the known electroacoustic ratio and on permeability and the second compressional velocity obtained at the first step. Calculations demonstrate that the electroacoustic ratio is proportional to the electroacoustic constant with high accuracy:

$$\frac{E}{P} = \alpha\varphi(\alpha, \overline{\chi}, c_{p2}), \qquad (18)$$

where the function $\phi(\alpha,\overline{\chi},c_{p2})$ depends weakly on $\alpha$. The only exception is the domain where the electroacoustic constant is extremely high. Thus, knowing the measured electroacoustic ratio and the theoretically computed electroacoustic ratio for an arbitrary value of $\alpha$, we can find the true value of the electroacoustic constant. Finally, we can calculate permeability from the electroacoustic constant and the friction coefficient, using the following formulae:

$$\chi = \overline{\chi} + \alpha^2/\sigma, k = \frac{\eta}{\chi\rho\rho_l}, \qquad (19)$$

where $\sigma$ is electrical conductivity, $\eta$ is dynamic viscosity of saturating fluid, $\rho_l$ is partial fluid density of the medium. These parameters have to be measured independently.

Figure 11:
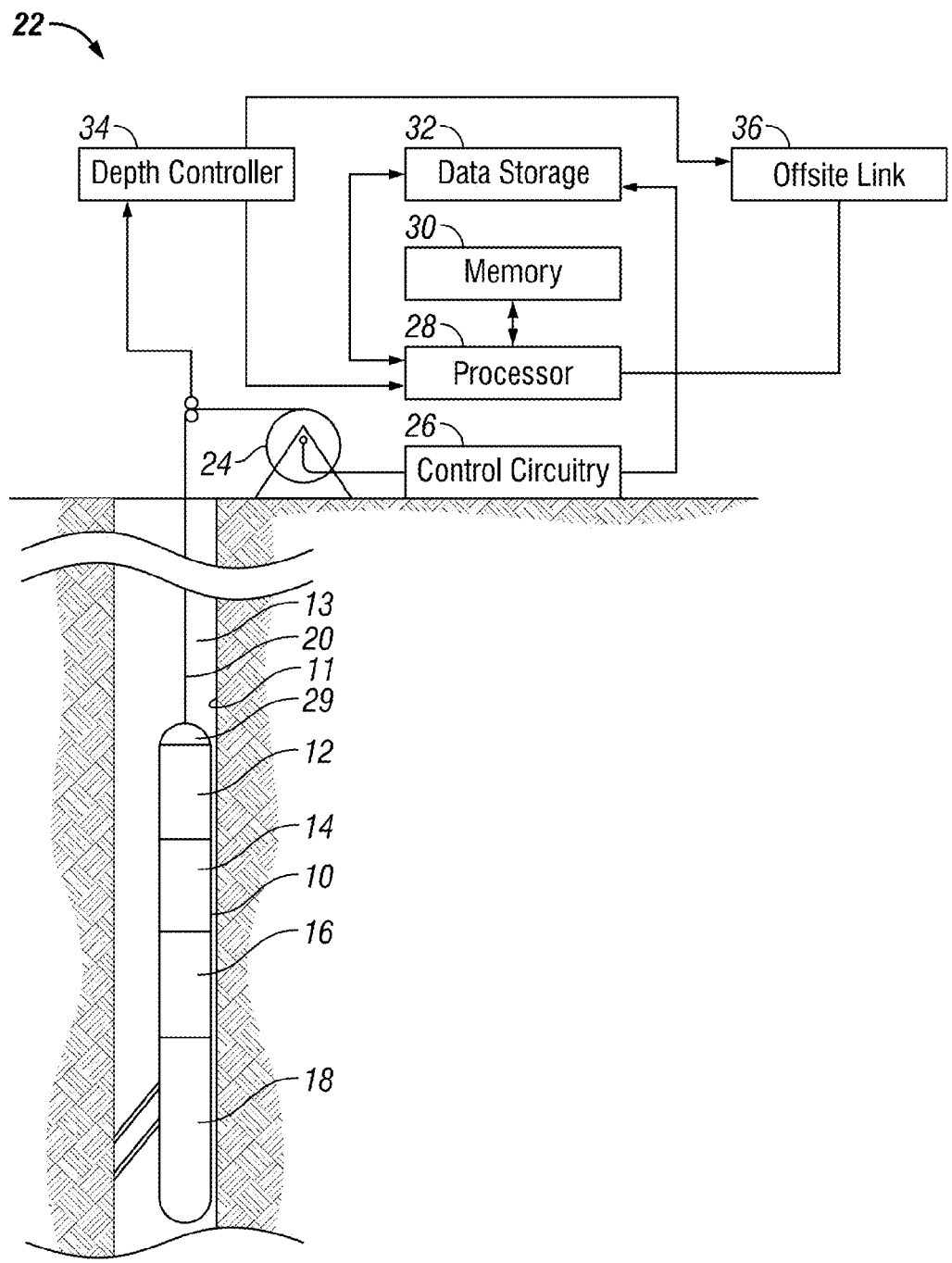
FIG. 11 shows a logging system suitable for implementing the present disclosure.

A typical configuration of a logging system for implementing the disclosure above is shown in FIG. 11. This is a modification of an arrangement from U.S. Pat. No. 4,953,399 to Fertl et al., having the same assignee as the present disclosure, the contents of which are incorporated herein by reference. Shown in FIG. 1 is a suite of logging instruments 10, disposed within a borehole 13 penetrating an earth formation 11, illustrated in vertical section, and coupled to equipment at the earth's surface, in accordance with various illustrative embodiments of the method and apparatus of the present disclosure. Logging instrument suite 10 may include a resistivity device 12, a natural gamma ray device 14, and/or two porosity-determining devices, such as a neutron device 16 and/or a density device 18. Collectively, these devices and others used in the borehole for logging operations are referred to as formation evaluation sensors. The resistivity device 12 may be one of a number of different types of instruments known to the art for measuring the electrical resistivity of formations surrounding a borehole so long as such device has a relatively deep depth of investigation. For example, a HDIL (High Definition Induction Logging) device such as that described in U.S. Pat. No. 5,452,761 to Beard et al., having the same assignee as the present disclosure, the contents of which are fully incorporated herein by reference, may be used. The natural gamma ray device 14 may be of a type including a scintillation detector including a scintillation crystal cooperatively coupled to a photomultiplier tube such that when the crystal is impinged by gamma rays a succession of electrical pulses is generated, such pulses having a magnitude proportional to the energy of the impinging gamma rays. The neutron device 16 may be one of several types known to the art for using the response characteristics of the formation to neutron radiation to determine formation porosity. Such a device is essentially responsive to the neutron-moderating properties of the formation. The density device 18 may be a conventional gamma-gamma density instrument such as that described in U.S. Pat. No. 3,321,625 to Wahl, used to determine the bulk density of the formation. A downhole processor 29 may be provided at a suitable location as part of the instrument suite.

The logging instrument suite 10 is conveyed within borehole 11 by a cable 20 containing electrical conductors (not illustrated) for communicating electrical signals between the logging instrument suite 10 and the surface electronics, indicated generally at 22, located at the earth's surface. The logging devices 12, 14, 16, and/or 18 within the logging instrument suite 10 are cooperatively coupled such that electrical signals may be communicated between each of the logging devices 12, 14, 16, and/or 18 and the surface electronics 22. The cable 20 is attached to a drum 24 at the earth's surface in a manner familiar to the art. The logging instrument suite 10 is caused to traverse the borehole 11 by spooling the cable 20 on to or off of the drum 24, also in a manner familiar to the art.

The surface electronics 22 may include such electronic circuitry as is necessary to operate the logging devices 12, 14, 16, and/or 18 within the logging instrument suite 10 and to process the data therefrom. Some of the processing may be done downhole. In particular, the processing needed for making decisions on speeding up (discussed below) or slowing down the logging speed is preferably done downhole. If such processing is done downhole, then telemetry of instructions to speed up or slow down the logging could be carried out substantially in real time. This avoids potential delays that could occur if large quantities of data were to be telemetered uphole for the processing needed to make the decisions to alter the logging speed. It should be noted that with sufficiently fast communication rates, it makes no difference where the decision-making is carried out. However, with present data rates available on wirelines, the decision-making is preferably done downhole.

Control circuitry 26 contains such power supplies as are required for operation of the chosen embodiments of logging devices 12, 14, 16, and/or 18 within the logging instrument suite 10 and further contains such electronic circuitry as is necessary to process and normalize the signals from such logging devices 12, 14, 16, and/or 18 in a conventional manner to yield generally continuous records, or logs, of data pertaining to the formations surrounding the borehole 11. These logs may then be electronically stored in a data storage 32 prior to further processing. A surface processor 28 may process the measurements made by the formation evaluation sensor(s) 12, 14, 16, and/or 18. This processing could also be done by the downhole processor 29.

The surface electronics 22 may also include such equipment as will facilitate machine implementation of various illustrative embodiments of the method of the present disclosure. The surface processor 28 may be of various forms, but preferably is an appropriate digital computer programmed to process data from the logging devices 12, 14, 16, and/or 18. A memory unit 30 and the data storage unit 32 are each of a type to interface cooperatively with the surface processor 28 and/or the control circuitry 26. A depth controller 34 determines the longitudinal movement of the logging instrument suite 10 within the borehole 11 and communicates a signal representative of such movement to the surface processor 28. The logging speed is altered in accordance with speedup or slowdown signals that may be communicated from the downhole processor 29, and/or provided by the surface processor 28, as discussed below. This is done by altering the rotation speed of the drum 24. Offsite communication may be provided, for example, by a satellite link, by a telemetry unit 36.

Figure 12:
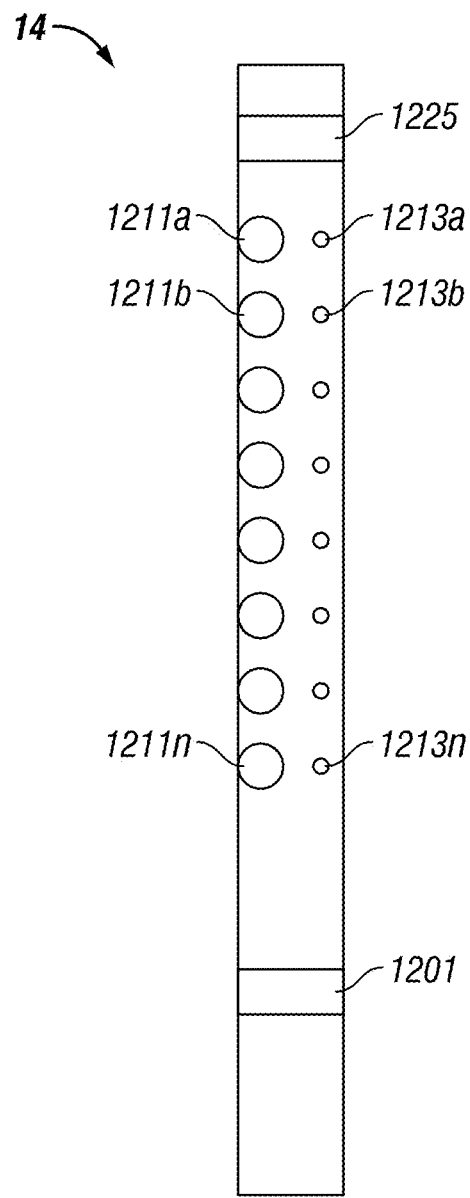
FIG. 12 shows a logging tool suitable for implementing the present disclosure.

FIG. 12 shows an exemplary logging tool 14 according to the present disclosure. This includes an acoustic source 1201, a plurality of acoustic detectors such as hydrophones 1211a, 1211b . . . 1211n and associated electrodes 1213a, 1213b . . . 1213n. The acoustic source may be a monopole source so as to increase the excitation of Stoneley waves in the borehole (not shown in FIG. 12).

Figure 13:
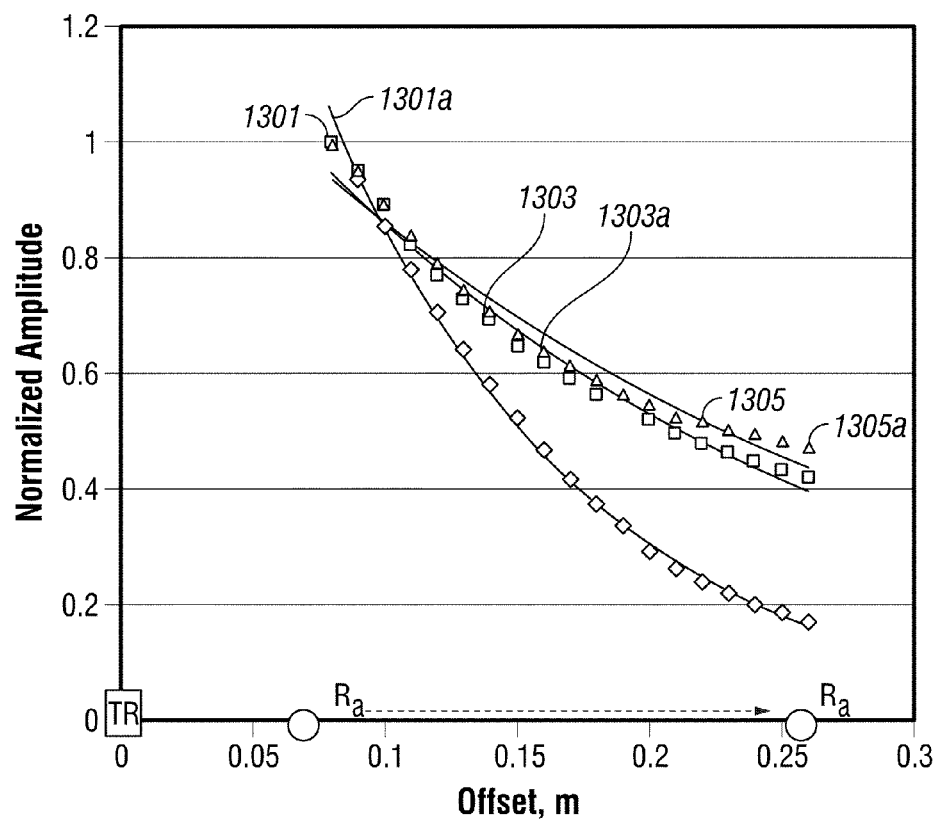
FIG. 13 shows Stoneley wave amplitudes from acoustic measurements for different salinities of a borehole fluid in a model.

In the disclosure above, the effect of salinity of the fluid in the borehole has not been considered. This is considered next, FIG. 13 shows normalized amplitudes of the Stoneley waves measured using the acoustic transducers 1211a, 1211b . . . 1211n. The abscissa is the distance between the acoustic source 1201 and the acoustic transducer. The smooth curve 1301a is an exponential fit to data points 1301 when the borehole fluid is tap water. The smooth curve 1303a is an exponential fit to data points 1303 when the borehole fluid is water with 10 g/l of salt, while the smooth curve 1305a is an exponential fit to data points 1305 when the borehole fluid is water with 20 g/l of salt. The calculated Stoneley wave attenuation length for the curves 1301a, 1303a and 1305a are 10 cm, 20 cm and 23 cm respectively.

Figure 14:
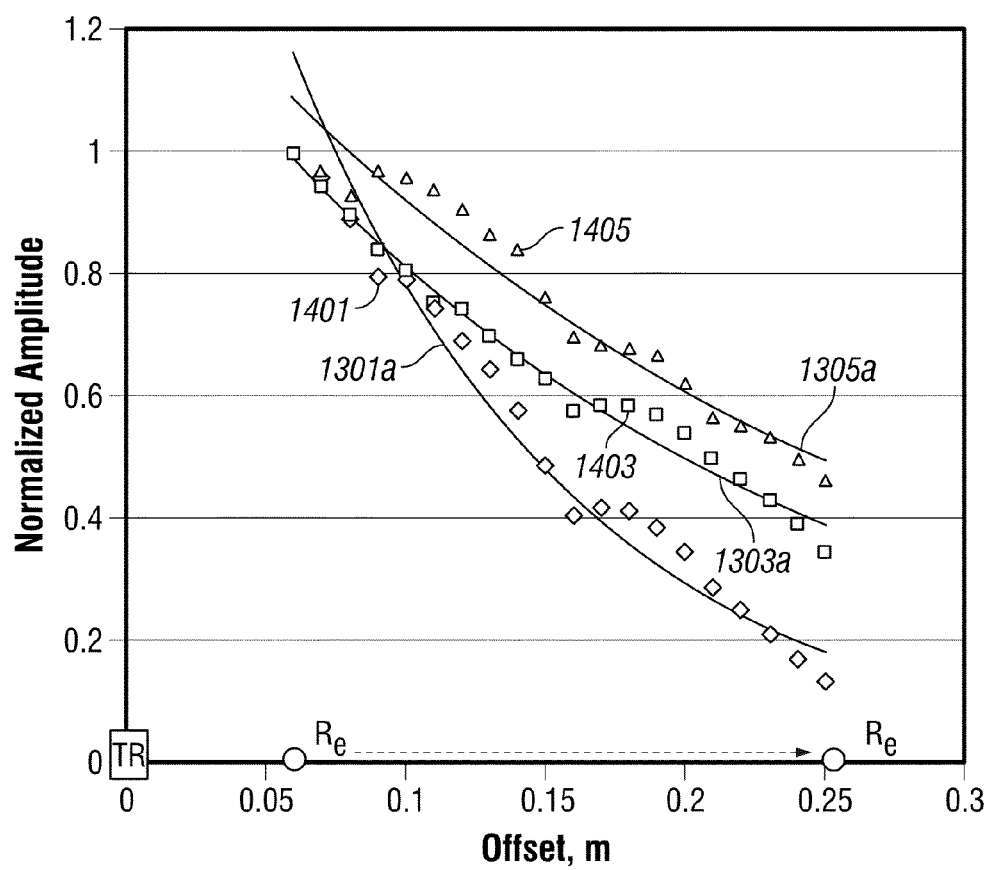
FIG. 14 shows Stoneley wave amplitudes from electroacoustic measurements for different salinities of a borehole fluid in a model.

FIG. 14 shows normalized amplitudes of the Stoneley waves measured using the electrodes 1213a, 1213b . . . 1213n. The abscissa is the distance between the acoustic source 1201 and the acoustic detector. The smooth curve 1301a is from FIG. 13 and data points 1401 when the borehole fluid is tap water. The smooth curve 1303a is from FIG. 13 and data points 1403 correspond to water with 10 g/l of salt, while the smooth curve 1305a is from FIG. 13 and data points 1405 correspond to a borehole water with 20 g/l of salt.

It was also noted that the phase velocity of the Stoneley waves was independent of salinity. This independence of phase velocity from salinity and the strong dependence of the Stoneley wave attenuation length on salinity (in the lower salinity ranges) suggests that an osmotic pressure drop occurs at the interface between the porous medium and the borehole fluid, and this may be responsible for the effect of borehole fluid salinity on the attenuation length of the compressional waves.

Figure 15:
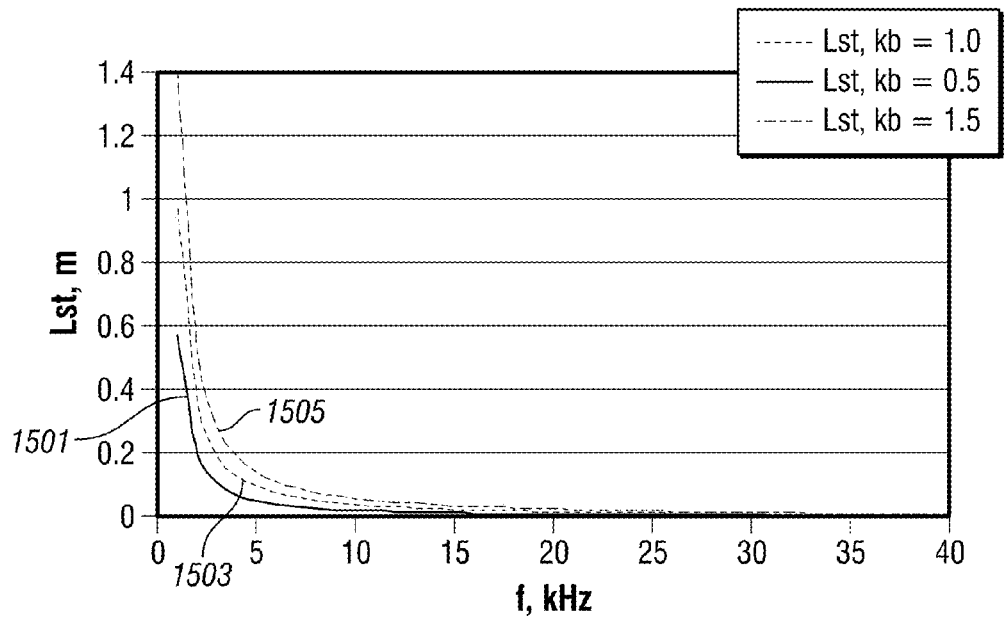
FIG. 15 shows the effect of changes in partial pressure continuity coefficient on attenuation length of Stoneley waves.

The theoretical analysis of the dissipative properties of the Stoneley waves builds its wave field reconstruction upon the partial pressures continuity condition $P^{(0)}/\rho^{(0)} = k_{b\text{-}P}{}^{(1)}/\rho^{(1)}$. Here, the superscript$^{(0)}$ corresponds to borehole fluid, the superscript$^{(1)}$, to the porous medium; $\rho^{(0)}$, $\rho^{(1)}$ are partial densities of the media. In the case of zero concentration, when no solute is dissolved in fluid, the coefficient $k_b$ becomes $k_b=1$. This constant is referred to as the partial pressure continuity coefficient (PPCC). The osmotic effects may affect the value of this coefficient, i.e. they may change the value of the pressure drop at the interface between the media. FIG. 15 shows the impact of the pressure drop on the Stoneley wave attenuation length for three values of the coefficient PPCC=0.5, 1.0 and 1.5 (1501, 1503, 1505) respectively. The abscissa is the frequency, the ordinate is the Stoneley wave attenuation length. The calculations were made using the theory developed above, i.e., with no salinity, and applying the partial pressure continuity condition.

Figure 16:
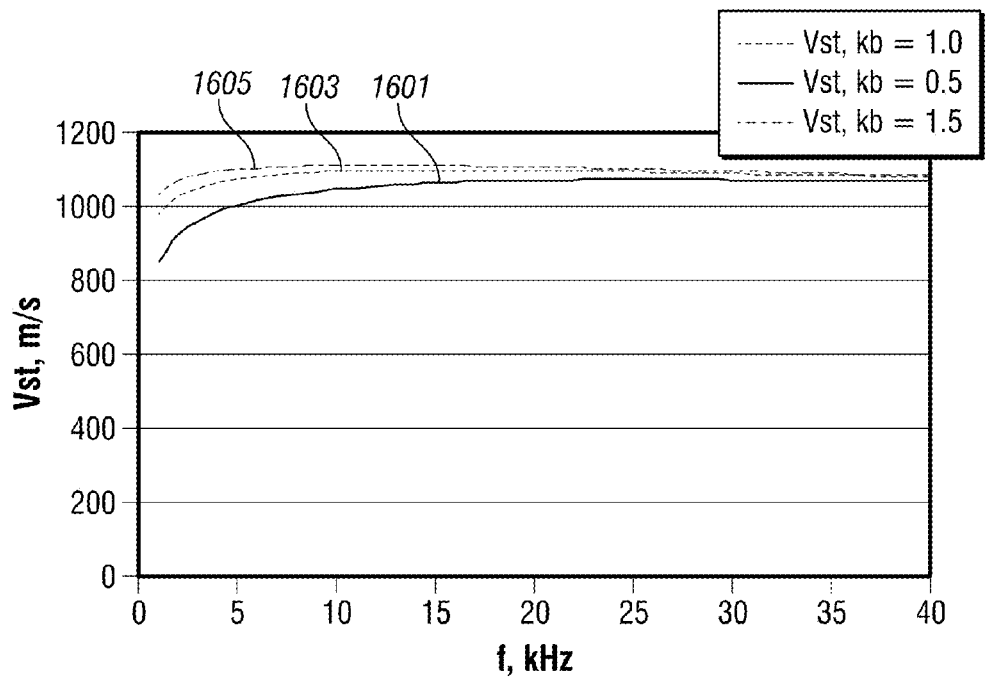
FIG. 16 shows the effect of changes in partial pressure continuity coefficient on phase velocity of Stoneley waves.

As can be seen, the difference in attenuation lengths at a frequency of 15 kHz for $k_b=1.5$ is 60%, whereas the impact of this drop on the Stoneley wave velocity is only 2%, i.e. it is within the measurement error and thus has no effect. This is shown in FIG. 16 where the Stoneley wave phase velocity is plotted as a function of frequency for PPCC=0.5, 1.0 and 1.5 (1601, 1603, 1605) respectively.

Figure 17A:
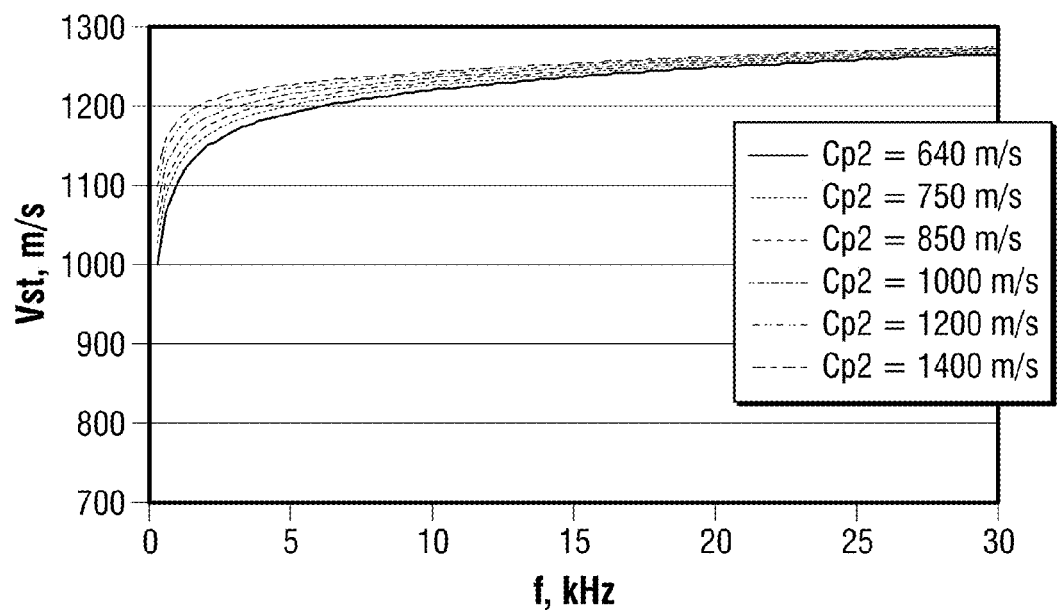
FIG. 17A shows the theoretical dependence of the Stoneley wave phase velocity on the second compressional velocity of sound.
Figure 17B:
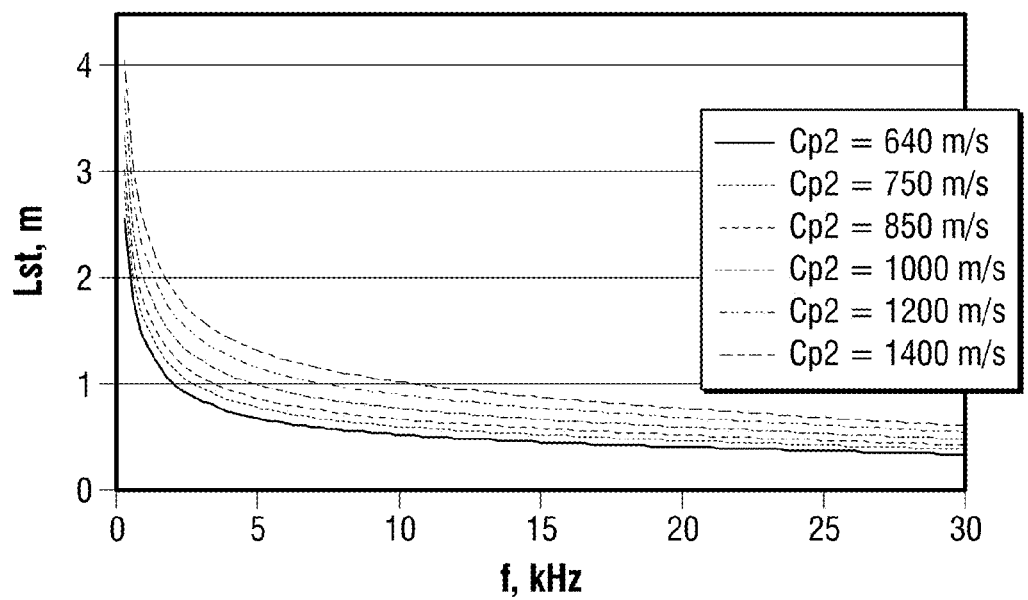
FIG. 17B shows the theoretical dependence of the Stoneley wave attenuation length on the second compressional velocity of sound.

The theoretical basis for the method of accounting for osmosis in the present disclosure lies in the pre-computed electroacoustic properties of the Stoneley wave in the wellbore, taking into account the dependence on saline concentration in the electrolyte. The measurement method is based upon the fundamental dissipative properties of the Stoneley wave phase velocity and dissipative properties of the electroacoustic ratio. FIG. 17a shows the theoretical dependence of the Stoneley wave phase velocity on the second compressional velocity of sound (its asymptotic value in the high frequency domain) in the porous medium. FIG. 17b shows the theoretical dependence of the Stoneley wave attenuation length on the second compressional velocity of sound (its asymptotic value in the high frequency domain) in the porous medium.

Figure 18:
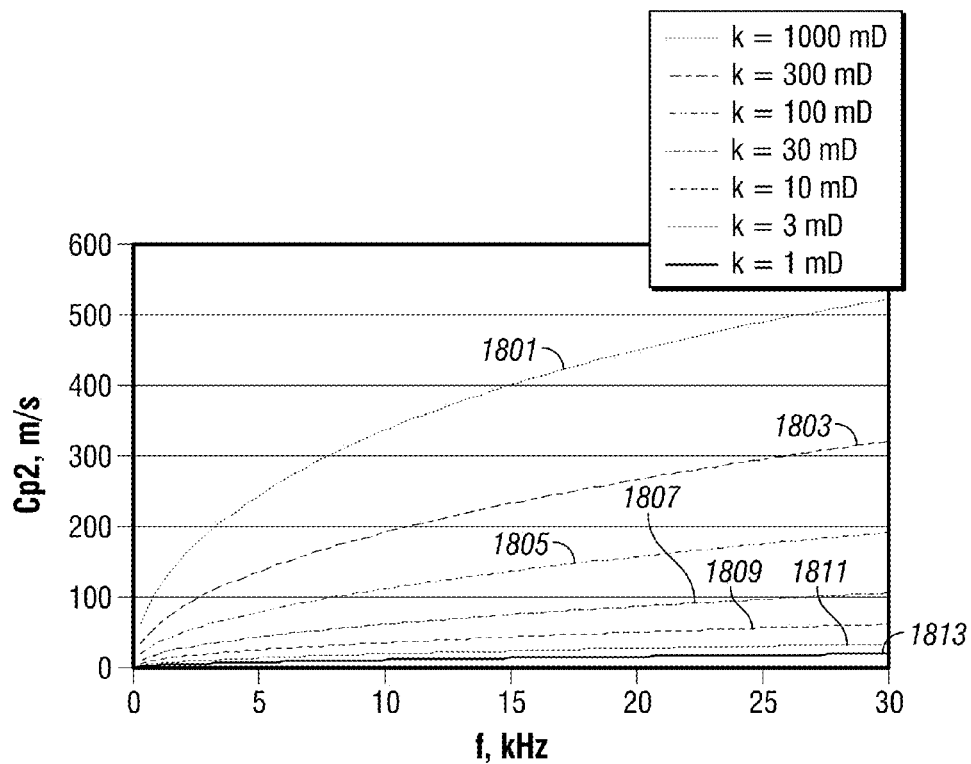
FIG. 18 shows the frequency dependence of the second compressional velocity $c_{p2}$ for the porous medium having permeability k.

It should be noted that permeability dependence of the properties of the Stoneley waves is determined only by their dependences on the second compressional velocity of sound in the saturated porous medium. On the other hand, the second compressional velocity of sound strongly depends on permeability of the porous medium. This characteristic dependence is given in FIG. 18 below. The curve 1801 is for 1000 mD, 1803 is for 300 nD, 1805 is for 100 mD, 1807 is for 30 mD, 1809 is for 10 mD, 1811 is for 3 mD, and 1813 is for 1 mD, Dependence of the Stoneley waves on concentration is shown in FIGS. 13 and 14.

As we now have both the measured frequency dependences ($\omega$) for the phase velocity $v^*_{st}(\omega)$ and attenuation length $L^*_{st}(\omega)$ of the Stoneley waves, which correspond to the theoretically computed dependences $L_{st}(\omega,c)$, $v_{st}(\omega,c)$, and also the value of saline concentration (c) on the surface, we can write out three functional dependences:

$$v_{st}(\bar{\chi}, c_{p2}, c) = v^*_{st}(\omega),$$

$$L_{st}(\bar{\chi}, c_{p2}, c) = L^*_{st}(\omega),$$

$$c_{p2}(\omega, c) = c_{p2}(\bar{\chi}) \tag{20}$$

Figure 19A:
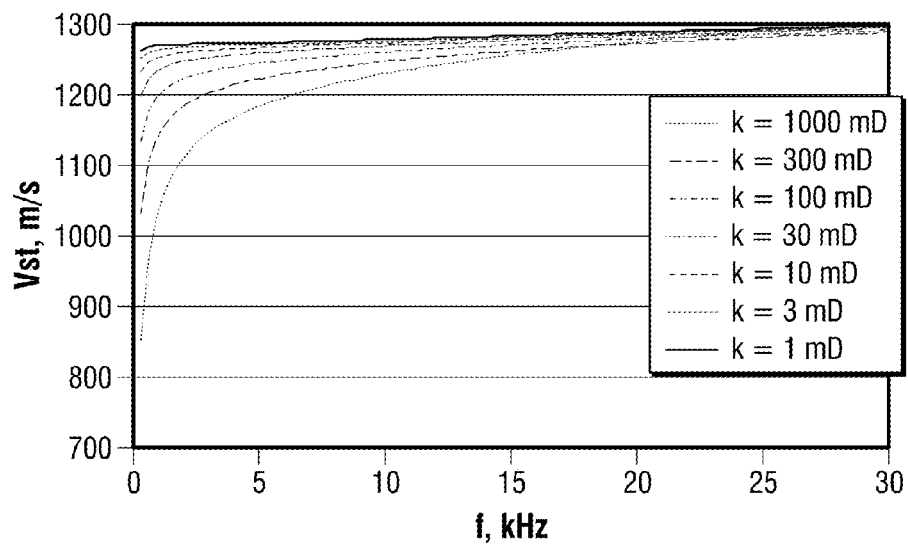
FIG. 19A shows the frequency dependence for the phase velocity of the Stoneley wave for a fixed electroacoustic constant.
Figure 19B:
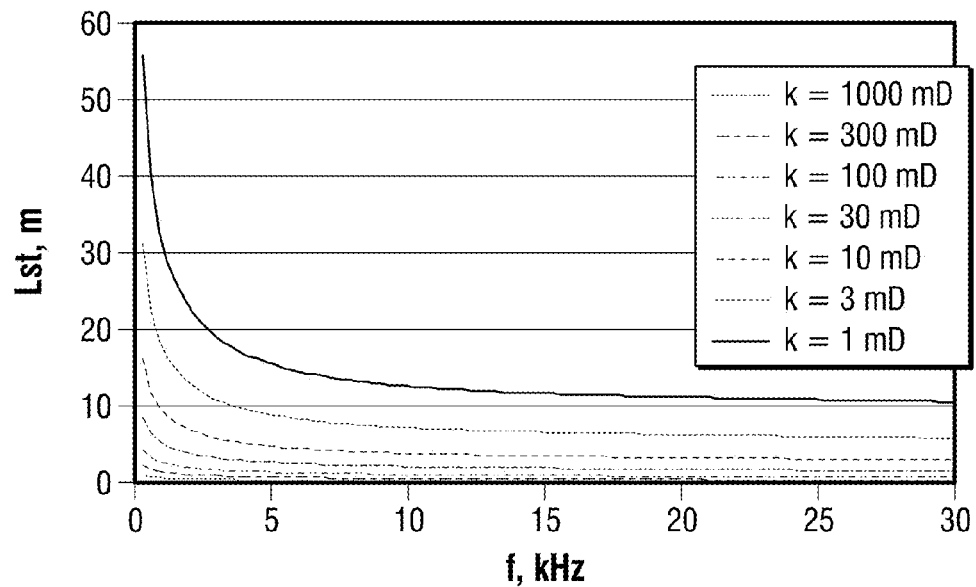
FIG. 19B shows the frequency dependence for the attenuation length of the Stoneley wave for a fixed electroacoustic constant.

Based on these dependences, we compute the friction coefficient theoretically, taking into account the electroacoustic constant $\bar{\chi} = \chi - \alpha^2/\sigma$. Resulting frequency dependence for the phase velocity of the Stoneley wave and its attenuation length at a fixed electroacoustic constant are shown in FIGS. 19a, 19b.

The electroacoustic ratio (the ratio between the electric field amplitude to the acoustic amplitude that has excited this electric field) is a function of the friction coefficient $\bar{\chi}$, the second compressional velocity of sound $c_{p2}$, and electroacoustic constant $\alpha$:

$$\frac{E}{P} = \varphi(\alpha, \bar{\chi}, c_{p2}, c). \tag{20}$$

Figure 20:
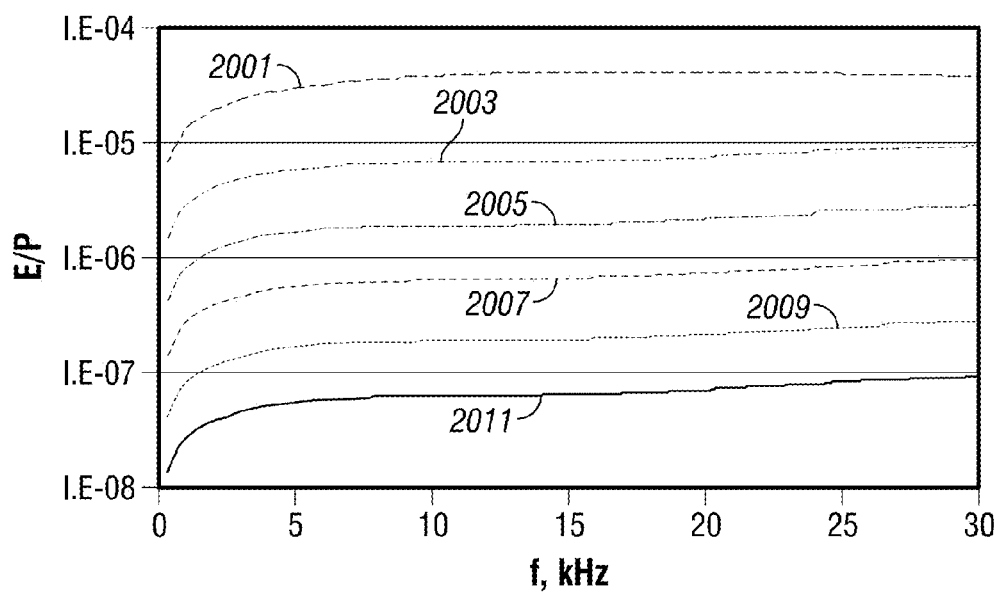
FIG. 20 shows the frequency dependence of the electroacoustic ratio E/P at a fixed permeability of 1000 mD for the following values of the electroacoustic constant α: (1)—$10^6$, (2)—$3·10^6$, (3)—$10^7$, (4)—$3·10^7$, (5)—$10^8$, (6)—$3·10^8$ cm/(Gs·$s^2$)

As we now have both the experimental value of the electroacoustic ratio and also $\bar{\chi}$, we can compute the value of the electroacoustic constant $\alpha$. The basis for this method of finding the electroacoustic constant is given below: this dependence is computed theoretically. FIG. 20 shows the frequency dependence of the electroacoustic ratio E/P at a fixed permeability of 1000 mD for the following values of the electroacoustic constant $\alpha$: (2001)—$10^6$, (2003)—$3 \cdot 10^6$, (2005)—$10^7$, (2007)—$3 \cdot 10^7$, (2009)—$10^8$, (2011)—$3 \cdot 10^8$ cm/(Gs·s$^2$).

At the final stage, the true friction coefficient is found without taking into account the electroacoustic effect as follows:

$$\chi = \bar{\chi} + \alpha^2/\sigma, \quad k = \eta/\rho\rho_f\chi \tag{21}$$

It is this (acoustic) friction coefficient χ that determines permeability of the medium k.

This procedure of joint theoretical and experimental measurements enables us to determine permeability k and the electroacoustic constant α one after another. An additional, but important result is the second compressional velocity of sound $c_{p2}$. Having experimentally found the right-hand sides of the set of equations:

$$v_{st}(\overline{\chi}, c_{p2}, \omega, c) = v^*_{st}(\omega),$$
$$L_{st}(\overline{\chi}, c_{p2}, \omega, c) = L^*_{st}(\omega),$$
$$\varphi(\alpha, \overline{\chi}, c_{p2}, \omega,) = \frac{E}{P}(\omega),$$

(22)

(frequency dependence of the Stoneley wave velocity $v_{St}$, its attenuation length $L_{St}$, the acoustoelectric ratio E/P, saline concentration at the interface between the media c), we solve this set of equations and obtain permeability k, the electroacoustic constant α, and the second compressional velocity $c_{p2}$.

Figure 21:
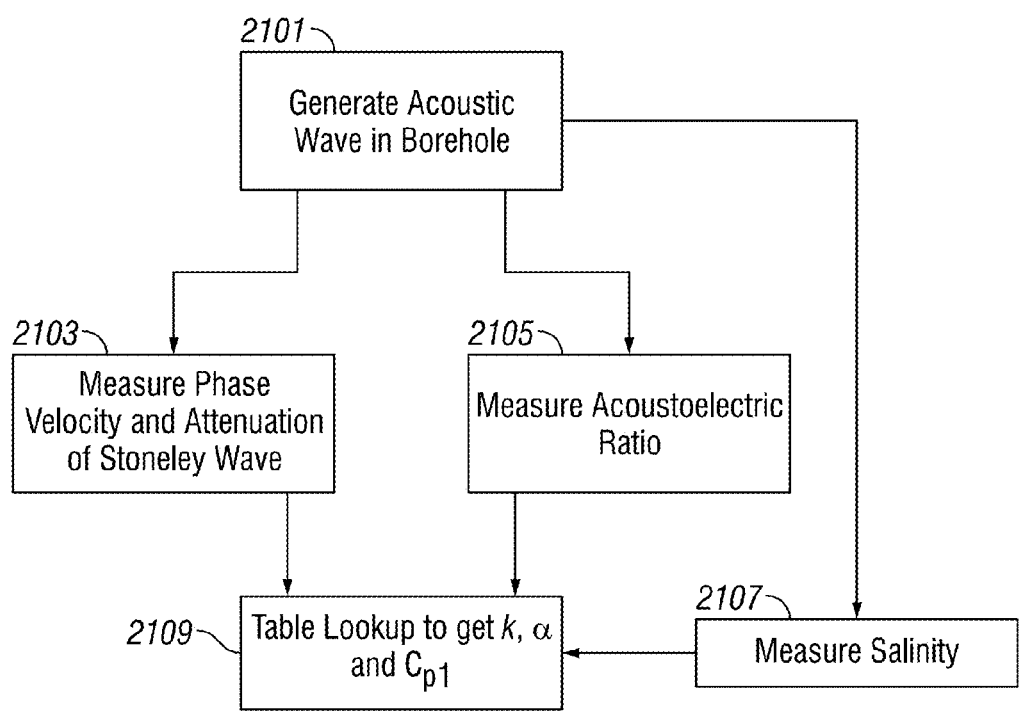
FIG. 21 shows a flow chart of some of the steps of the present disclosure.

This is illustrated in FIG. 21. An acoustic source 1201 is activated in the borehole. Measurements are made with the acoustic detectors 1211a, 1211b . . . 1211n and are analyzed to get $v^*_{st}(\omega)$ and $L^*_{st}(\omega)$. The acoustoelectric ratio E/P is estimated 2105 using measurements made by the electrodes 1213a, 1213b, . . . , 1213n. The salinity is measured 2107 using the device 1225. This device may be an optical refractometer. Using the three measurements of $v^*_{st}(\omega)$, $L^*_{st}(\omega)$ and E/P, a table lookup gives estimates of the unknown quantities $c_{p2}$, $\overline{\chi}$, and α.

The processing of the measurements made in wireline applications may be done by the surface processor 28, by the downhole processor 29, or at a remote location. The data acquisition may be controlled at least in part by the downhole electronics. Implicit in the control and processing of the data is the use of a computer program on a suitable machine readable-medium that enables the processors to perform the control and processing. The machine-readable medium may include ROMs, EPROMs, EEPROMs, flash memories and optical disks. The term processor is intended to include devices such as a field programmable gate array (FPGA).

While the foregoing disclosure is directed to specific embodiments of the present disclosure, various modifications will be apparent to those skilled in the art. It is intended that all variations within the scope of the appended claims be embraced by the foregoing disclosure.

What is claimed is:

1. A method of estimating a value of a property of a porous earth formation, the method comprising:
 using an acoustic source in a borehole that is propagating Stoneley wave for generating an acoustic wave in the borehole;
 producing a first signal indicative of a pressure associated with the generated acoustic wave in the borehole;
 producing a second signal indicative of an electric potential associated with the generated acoustic wave; and
 using an attenuation length for the propagating Stoneley wave derived from the first signal and the second signal for estimating the value of a property of the formation selected from: (i) a permeability of the formation, (ii) an electroacoustic constant of the formation
 by estimating a second compressional velocity associated with the acoustic wave using at least the attenuation length for the acoustic wave.

2. The method of claim 1 wherein the second compressional velocity corresponds to a Biot wave of the second kind.

3. The method of claim 1 wherein the generated acoustic wave further comprises a Stoneley wave.

4. The method of claim 3 wherein estimating the value of the property further comprises estimating a Stoneley wave velocity and estimating a Stoneley wave attenuation length as a function of frequency.

5. The method of claim 1 further comprising measuring a salinity of a fluid in the borehole fluid and using the measured salinity for estimating the value of the property of the formation.

6. The method of claim 5 wherein estimating the value of the property of the formation further comprises using a partial pressure continuity condition at a boundary of the borehole.

7. The method of claim 1 further comprising conveying the acoustic source into the borehole on a wireline.

8. The method of claim 1, further comprising:
 using phase velocity derived from the first signal and the second signal for estimating the value of the property of the formation.

9. The method of claim 1, further comprising:
 estimating the value of the property of the formation by solving an inverse problem to determine the second compressional velocity and a theoretical acoustic friction coefficient.

10. The method of claim 1, further comprising:
 estimating the value of the property of the formation using a first compressional velocity associated with the acoustic wave and a transverse velocity associated with the acoustic wave, the first compressional velocity and the transverse velocity determined from the first signal and the second signal.

11. An apparatus configured to estimate a value of a property of a porous earth formation, the apparatus comprising:
 a tool configured to be conveyed in a borehole;
 an acoustic source on the tool configured to generate an acoustic wave in the borehole that is a propagating Stoneley wave;
 an acoustic detector on the tool configured to produce a first signal indicative of a pressure associated with the generated acoustic wave in the borehole;
 a second detector configured to produce a second signal indicative of an electric potential associated with the generated acoustic wave; and
 a processor configured to use an attenuation length for the propagating Stoneley wave derived from the first signal and the second signal for estimating the value of a property of the formation selected from: (i) a permeability of the formation, (ii) an electroacoustic constant of the formation,
 by estimating a second compressional velocity associated with the acoustic wave using at least the attenuation length for the acoustic wave.

12. The apparatus of claim 11 wherein the processor is configured to estimate the second compressional velocity of a Biot wave of the second kind.

13. The apparatus of claim 11 wherein the generated acoustic wave further comprises a Stoneley wave.

14. The apparatus of claim 13 wherein the processor is configured to estimate the value of the property by further estimating a Stoneley wave velocity as a function of frequency and estimating a Stoneley wave attenuation length.

15. The apparatus of claim 11 further comprising a salinity measuring device configured to measure a salinity of a fluid in the borehole fluid and wherein the processor is further configured to use the measured salinity for estimating the value of the property of the formation.

16. The apparatus of claim 15 wherein the processor is further configured to estimate the value of the property of the formation by using a partial pressure continuity condition at a boundary of the borehole.

17. The apparatus of claim 11 further comprising a wireline configured to convey the acoustic source into the borehole.

18. A non-transitory computer-readable medium product having stored thereon instructions that when read by a processor causes the processor to execute a method, the method comprising:

using an attenuation length for a propagating Stoneley wave in a borehole produced by an acoustic source, the attenuation length derived from a first signal indicative of a pressure associated with the propagating Stoneley wave and a second signal indicative of an electric potential associated with the propagating Stoneley wave for estimating a property of an earth formation selected from (i) a permeability of the formation, (ii) an electroacoustic constant of the formation by estimating a second compressional velocity associated with the acoustic wave using at least the attenuation length for the acoustic wave.

19. The non-transitory computer-readable medium product of claim 18 further comprising at least one of: (i) a ROM, (ii) an EPROM, (iii) an EEPROM, (iv) a flash memory, and (v) an optical disk.

* * * * *